May 7, 1935.  R. J. NEELY  2,000,246

OUTLET FITTING FOR TANKS

Filed Oct. 15, 1934

INVENTOR
Raymond J. Neely
by Parker, Crocknow & Harmer
ATTORNEYS

Patented May 7, 1935

2,000,246

UNITED STATES PATENT OFFICE 2,000,246

OUTLET FITTING FOR TANKS

Raymond J. Neely, Little Falls, N. Y., assignor to Cherry-Burrell Corporation, Wilmington, Del., a corporation of Delaware Application October 15, 1934, Serial No. 748,339

12 Claims. (Cl. 137—21)

This invention relates to outlet valves or fittings for tanks and more especially to improvements in valved outlet fittings suitable for truck tanks intended for transporting liquids such as milk. Since truck tanks are used on the roads, under all sorts of weather conditions, and the parts thereof are exposed to dust, rain, mud and other sources of contamination, it is important in the use of such tanks for transporting milk or other liquids requiring sanitary precautions, to prevent such foreign matter from reaching the liquid outlet of the tank or the controlling valve therefor, so as to avoid possible contact of the same with the contents of the tank. Other desiderata in connection with such a fitting are that the distance it projects out from the body of the tank should be reduced to the minimum and that the discharge end of the outlet should be directed longitudinally outward instead of downwardly or laterally.

The objects of this invention are to provide an outlet valve which will fulfill these requirements; in which the discharge passage of the valve body has offset portions so as to allow the operating handle or hand wheel for the valve to be set close to the tank, thus decreasing the overhang of the valve compared to previous constructions; which includes improved means for enclosing the discharge end of the outlet fitting and the valve operating means to protect these parts from dust and other contamination; which includes means for preventing the valve from working loose, due to vibration in transit; which prevents the accidental unscrewing or loosening of the outlet cap; in which the dust or protecting cover for the outlet and its valve means functions, when closed, to prevent movement of the valve or the loosening of the outlet cap, and in addition, precludes tampering with these parts; in which the discharge end of the outlet and the valve operating device are arranged to provide an axial outlet instead of a bottom or side outlet; and which has the other features of advantage and improvement hereinafter described and set forth in the claims.

Figure 1:
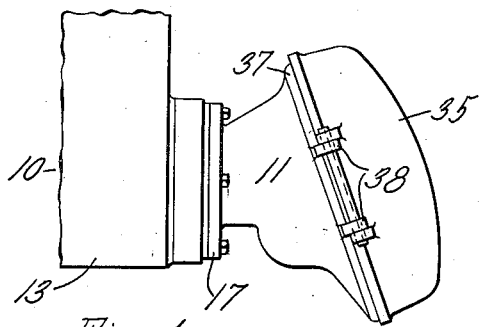
Fig. 1 is a side elevation of a valved tank outlet fitting embodying the invention.
Figure 2:
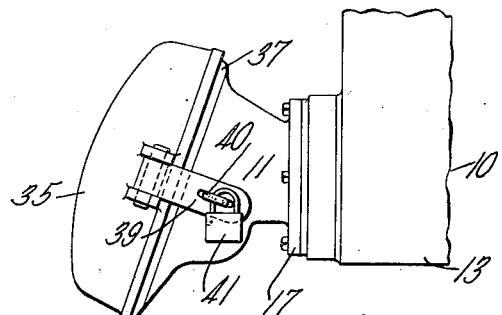
Fig. 2 is an opposite side elevation thereof.
Figure 3:
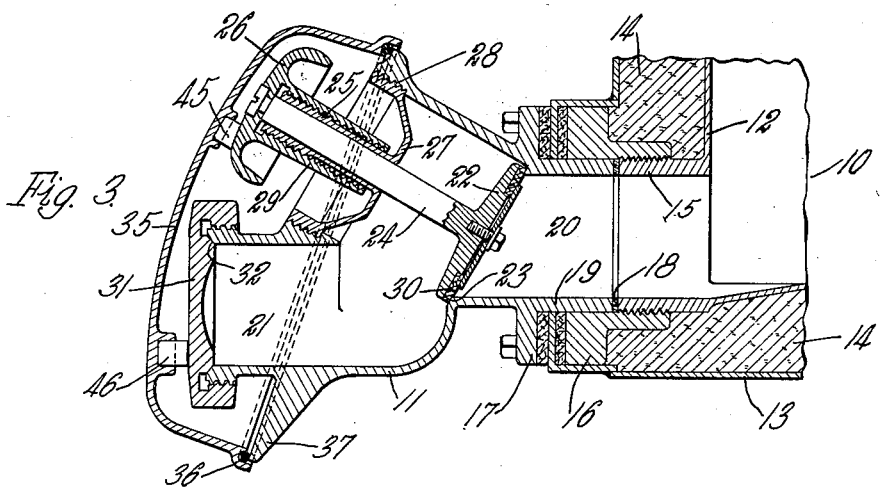
Fig. 3 is a longitudinal, sectional elevation thereof, showing the protecting cover in its closed position.
Figure 4:
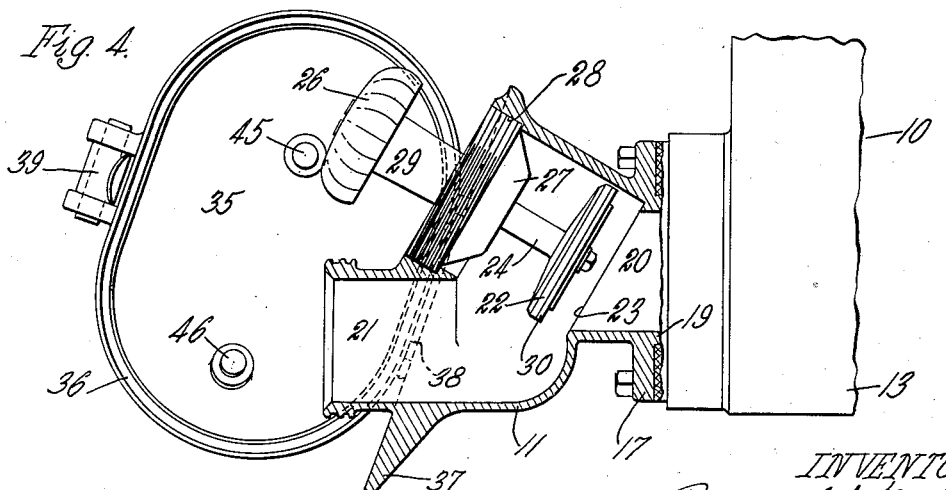
Fig. 4 is a similar sectional elevation showing the protecting cover open.

10 represents the bottom end portion of a truck tank which may be of any usual or suitable construction, and 11 represents the valve body of the outlet fitting for the tank. As shown, the tank is of jacketed or insulated construction having a lining 12 of material suitable for contact with the milk or other intended contents of the tank, an outer jacket or casing 13, and insulating material 14 between the lining and the jacket. The lining is provided with an outlet nipple 15 on which is screwed a flanged collar 16, and the outlet fitting or valve body 11 is bolted or otherwise suitably secured to this collar 16, the portion of the jacket surrounding the outlet being clamped between the collar 16 and a securing flange 17 on the valve body, with suitable packing gaskets interposed between the flange 17 and the jacket, and between the jacket and the collar 16. A packing gasket 18 is also clamped between the outer end of the nipple 15 and the alined neck or inner end 19 of the valve body.

The discharge passage through the valve body has an inlet end portion 20 which extends through the neck 19 in alinement with the passage through the tank nipple 15, and a discharge or outer end portion 21 which is offset with relation to the inlet portion 20 of the passage, this discharge end portion being, by preference, offset below and parallel with the inlet portion 20. Preferably, the movable element or disk 22 of the valve and its seat 23 are arranged at an inclination to the axis of the inlet portion of the discharge passage and the valve stem 24 extends from the valve disk at an upward and outward inclination through a guide sleeve 25 and is provided at its outer end with a hand wheel or handle 26 for operating the valve. An enlarged head or flange 27 on the guide sleeve 25 is screwed into a threaded opening 28 in the outer portion of the valve body in axial alinement with the valve seat, said opening 28 being of large enough internal diameter to allow the valve disk to pass therethrough when the valve guide is unscrewed and removed, so that the valve can be removed from the valve body for cleaning or other purposes by unscrewing the guide sleeve and removing it and the valve as a unit from the valve body. The flange 27 of the valve guide may be of internal polygonal or other form at its outer end adapted for the engagement therewith of a wrench or tool for unscrewing the guide. Preferably, the valve stem is slidable lengthwise in the guide sleeve 25 and the hand wheel 26 is swivelled on the outer end of the valve stem and is provided with an internally screw-threaded hub 29 which engages an external screw thread on the guide sleeve so that by turning the hand wheel in one or the other direction the valve will be moved toward and from its seat without turning. The valve disk may be faced with a gasket 30 of any suitable material adapted to form a liquid tight joint with the valve seat.

The outlet end of the discharge passage 21 is closed by a removable screw cap 31 which is screwed on the outlet nipple of the valve body, and this cap preferably has a ground conical face 32 adapted to seat against a complementary ground conical face at the outer end of the outlet nipple to tightly close the outlet. This cap supplements the valve in preventing discharge or leakage through the outlet.

35 represents the protecting and dust cover of the outlet fitting. This cover is of a size and shape to surround and enclose both the outlet cap 31 and the valve guide and hand wheel 26, and is provided with a rubber or other suitable packing gasket 36, preferably seated in a groove in the cover rim, which is adapted to be pressed against and form a dust and liquid-tight joint with a flange 37 on and surrounding the valve body. This flange is similar in peripheral form to the rim of the cover 25. As shown, the cover 35 is suitably hinged at one side thereof at 38 to the flange 37 of the valve body and at its opposite side is provided with fastening means which may comprise a hasp 39 pivoted to the cover and having a slot adapted to engage over a projecting lug 40 on the valve body. A padlock 41, adapted to be locked on the lug 40 outside of the hasp 39, serves to lock the cover in closed position and thus prevent it from being opened or the valve and cap 31 from being tampered with except by first unlocking the lock. The cover, when closed, thus forms a dust and rain-tight housing inclosing the valve operating wheel or device 26, the valve guide 25, and also the screw cap 31, and prevents access of rain, dust or other matter to any parts of the fitting where such matter could come in contact with the milk or contents of the tank and, in addition, the cover prevents unauthorized operation of or tampering with the valve and cap.

On its inside, the cover is provided with a bumper 45 adapted to press against the hand wheel 26, and with a second bumper 46 adapted to press against the screw cap 31 in a manner to prevent these parts from turning and working loose from the vibrations or jarring to which they are subjected in the use of the tank in transit. These bumpers 45 and 46 preferably consist of plugs or blocks of rubber or other suitable yielding material secured in sockets on the inside of the cover. When the cover is closed and secured, these bumpers are compressed firmly against the hand wheel 26 and screw cap 31, and by their pressure on and friction against the wheel and cap, securely hold these parts against turning and loosening.

It will be observed that by the described construction of the outlet fitting, while the outlet end portion of the discharge passage is offset relatively to the inlet end portion sufficiently to give a compact arrangement of the valve with its stem and handle beside the outlet end portion, the offsetting is not enough to obstruct view through the passage for its full length when the valve is open. This allows ready and thorough inspection by looking through the passages, which is very desirable from a sanitary standpoint.

I claim as my invention:

1. An outlet fitting for tanks comprising a valve body having a discharge passage extending therethrough, a movable valve member controlling said passage, an operating handle for said valve member extending out of the valve body and located outside of and adjacent said outlet end of the discharge passage, and a movable cover which in its closed position encloses both the outlet end of the discharge passage and said valve operating handle, said valve body having a portion which surrounds both said outlet end of the passage and the hole in the valve body through which said handle extends and with which the rim of the cover forms a tight joint uninterrupted throughout the peripheral extent of the cover rim.

2. An outlet fitting for tanks comprising a valve body having a discharge passage therethrough including longitudinal outlet and inlet end portions, said outlet end portion being offset with reference to said inlet end portion, a movable valve member controlling said passage, an operating handle for said valve member extending out of the valve body and located outside of and beside said outlet end portion of the discharge passage, and a movable cover which in its closed position encloses both the outlet end of the discharge passage and said valve operating handle, said valve body having a portion which surrounds both said outlet end of the passage and the hole in the valve body through which said handle extends and with which the rim of the cover forms a tight joint uninterrupted throughout the peripheral extent of the cover rim.

3. An outlet fitting for tanks comprising a valve body having a discharge passage therethrough including longitudinal inlet and outlet end portions, said outlet end portion being offset downwardly with reference to said inlet end portion, a movable valve member controlling said passage, an operating handle for said valve member arranged above said outlet end portion of the discharge passage, and a movable cover which in its closed position encloses the outlet end of the passage and said valve operating handle, said valve body having a portion with which the rim of the cover forms a tight joint uninterrupted throughout the peripheral extent of the cover rim.

4. An outlet fitting for tanks comprising a valve body having a discharge passage therethrough including longitudinal inlet and outlet end portions, said outlet end portion being offset downwardly with reference to said inlet end portion, a movable valve member controlling said passage, an operating handle for said valve member arranged above said outlet end portion of the discharge passage with its axis of rotation at an upward outward inclination relatively to the axis of said outlet end portion of the passage, and a movable cover which in its closed position encloses the outlet end of the passage and said valve operating handle, said valve body having a portion with which the rim of the cover forms a tight joint uninterrupted throughout the peripheral extent of the cover rim.

5. An outlet fitting for tanks comprising a valve body having a discharge passage therethrough including longitudinal inlet and outlet end portions, said outlet end portion being offset downwardly with reference to said inlet end portion, a movable valve member controlling said passage, a stem extending from said valve member out of the valve body above said outlet end portion of the discharge passage, an operating handle at the outer end of said valve stem located above said outlet end portion, and a removable guide for said valve stem closing an opening disposed in said valve body outwardly of said valve member, said valve member being removable through said opening when said guide is removed, thereby permitting the removal of said valve member, valve stem and guide without the necessity for access to the inside of the valve body.

6. An outlet fitting for tanks comprising a valve body having a discharge passage therethrough including longitudinal inlet and outlet end portions, said outlet end portion being offset downwardly with reference to said inlet end portion, a movable valve member controlling said passage, a valve stem extending from said valve member out of the valve body at an outward and upward inclination, an operating handle for said valve member at the outer end of said stem and located above said outer end portion of the discharge passage, a removable guide for said valve closing an opening disposed in the valve body outwardly of said valve member, said valve member being removable through said opening when said guide is removed from the valve body thereby permitting the valve, valve stem and guide to be removed as a unit outwardly from the valve body.

7. An outlet fitting for tanks comprising a valve body having a discharge passage therethrough including longitudinal inlet and outlet end portions, said outlet end portion being offset downwardly with reference to said inlet end portion, a movable valve member controlling said discharge passage, a valve stem extending at an upward outward inclination from said valve member, an operating handle at the outer end of said valve stem and located above said outlet end portion of the discharge passage, an inclined flange on and surrounding said valve body, and a movable cover which in its closed position encloses the outlet end of the discharge passage and said valve operating handle, and has a rim which in the closed position of the cover forms a tight joint with said flange continuous throughout the peripheral extent of the cover rim.

8. An outlet fitting for tanks comprising a valve body having a discharge passage therethrough including longitudinal inlet and outlet end portions, said outlet end portion being offset downwardly with reference to said inlet end portion, a removable cap closing the outer end of said discharge passage, a movable valve member controlling said discharge passage, an operating handle for said valve member located above said outlet end portion of the discharge passage, and a movable cover enclosing said cap and valve operating handle and having a rim which in closed position of the cover contacts throughout its peripheral extent with and forms a tight joint with the valve body.

9. An outlet valve fitting for tanks comprising a body having a discharge passage therethrough, a movable valve member controlling said passage, an operating handle for said valve member, a cap which closes the outer end of said discharge passage, a movable cover which encloses said cap and valve operating handle and which has a rim which in the closed position of the cover forms a tight joint throughout the peripheral extent of the rim with said valve body, and a part carried by said cover and which in the closed position of the cover engages and prevents movement of said cap.

10. An outlet valve fitting for tanks comprising a body having a discharge passage therethrough, a movable valve member controlling said passage, an operating handle for said valve member, a cap which closes the outer end of said discharge passage, a movable cover which encloses said cap and said valve operating handle and which has a rim which in the closed position of the cover forms a tight joint throughout the peripheral extent of the rim with said valve body, and a part carried by said cover and which in the closed position of the cover engages and prevents movement of the valve operating handle.

11. An outlet valve fitting for tanks comprising a body having a discharge passage therethrough, a movable valve member controlling said passage, an operating handle for said valve member, a cap which closes the outer end of said discharge passage, a movable cover which encloses said cap and valve operating handle and which has a rim which in the closed position of the cover forms a tight joint throughout the peripheral extent of the rim with said valve body, and parts carried by said cover and which in the closed position of said cover engage and prevent movement of said cap and said valve operating handle.

12. An outlet fitting for tanks comprising a valve body having a discharge passage therethrough including inlet and outlet end portions, said inlet and outlet portions extending from the tank at an angle to the vertical and in substantially like directions but being offset relatively to each other an amount less than the diameter of the passage thereby affording a view through the passage throughout its length, a movable valve member controlling said passage and having an actuating handle, said valve and handle being disposed at an angle to the axis of the discharge passage with the handle located beside said outlet portion of the passage.

RAYMOND J. NEELY.